United States Patent
Banthia

(10) Patent No.: US 9,845,601 B2
(45) Date of Patent: Dec. 19, 2017

(54) THREE-DIMENSIONALLY DEFORMED FIBER FOR CONCRETE REINFORCEMENT

(71) Applicant: OPTIMET CONCRETE PRODUCTS INC., Markham (CA)

(72) Inventor: Nemkumar Banthia, Vancouver (CA)

(73) Assignee: Optimet Concrete Products Inc., Markham (CA)

( * ) Notice: Subject to any disclaimer, the term of this patent is extended or adjusted under 35 U.S.C. 154(b) by 0 days.

(21) Appl. No.: 14/762,622

(22) PCT Filed: Jan. 30, 2014

(86) PCT No.: PCT/CA2014/000071
§ 371 (c)(1),
(2) Date: Jul. 22, 2015

(87) PCT Pub. No.: WO2014/117257
PCT Pub. Date: Aug. 7, 2014

(65) Prior Publication Data
US 2015/0361665 A1   Dec. 17, 2015

Related U.S. Application Data

(60) Provisional application No. 61/759,067, filed on Jan. 31, 2013.

(51) Int. Cl.
*E04C 5/00* (2006.01)
*E04C 5/03* (2006.01)
(Continued)

(52) U.S. Cl.
CPC ............ *E04C 5/012* (2013.01); *C04B 35/74* (2013.01); *C04B 35/78* (2013.01); *E04C 5/03* (2013.01);
(Continued)

(58) Field of Classification Search
CPC .......................................................... E04C 5/03
(Continued)

(56) References Cited

U.S. PATENT DOCUMENTS 1,349,901 A * 8/1920 Meischke-Smith ..... C04B 14/48
106/644
3,846,085 A * 11/1974 Dunn ...................... E04C 5/012
106/644
(Continued)

FOREIGN PATENT DOCUMENTS

GB           282226 A    12/1927

OTHER PUBLICATIONS

Product Monograph VDS Verband Deutscher Stahlfaserhersteller EV "Stahlfaserbeton—Stahlfasertypen", Jun. 23, 2006, pp. 1-4, XP0079010396 (with partial computer generated English translation).

*Primary Examiner* — Matthew Matzek
(74) *Attorney, Agent, or Firm* — Riches, McKenzie & Herbert LLP

(57) ABSTRACT

A concrete reinforcing member for admixture into a concrete composite. The concrete reinforcing member has a body extending in a longitudinal direction along an axis, the body having a lateral width. At least two anchor segments are axially spaced on the body, each anchor segment having at least one lateral extension projecting in a lateral direction along an associated plane that extends radially relative to the axis of the body. The associated plane of the lateral extension of one of the anchor segments is offset radially about the axis at an angle of greater than 0° and less than 90° relative to the associated plane of the lateral extension of the other anchor segment.

7 Claims, 17 Drawing Sheets

(51) Int. Cl.
*E04C 5/07* (2006.01)
*E04C 5/01* (2006.01)
*C04B 35/74* (2006.01)
*C04B 35/78* (2006.01)

(52) U.S. Cl.
CPC ....... *E04C 5/073* (2013.01); *Y10T 428/12389* (2015.01); *Y10T 428/2976* (2015.01)

(58) Field of Classification Search
USPC .......................................... 428/399, 397, 400
See application file for complete search history.

(56) References Cited

U.S. PATENT DOCUMENTS

| | | |
|---|---|---|
| 3,979,186 A | 9/1976 | Mizuma |
| 4,078,940 A | 3/1978 | Marsden |
| 4,233,364 A * | 11/1980 | van Thiel ................ E04C 5/012 |
| | | 428/399 |
| 4,804,585 A | 2/1989 | Tani et al. |
| 4,883,713 A | 11/1989 | Destree et al. |
| 4,960,649 A | 10/1990 | Takata et al. |
| 5,215,830 A | 6/1993 | Cinti |
| 5,443,918 A | 8/1995 | Banthia et al. |
| 5,451,471 A | 9/1995 | Over et al. |
| 5,965,277 A | 10/1999 | Banthia et al. |
| 5,981,630 A | 11/1999 | Banthia et al. |
| 6,045,910 A | 4/2000 | Lambrechts |
| 6,235,108 B1 | 5/2001 | Lambrechts |
| 2007/0261354 A1 | 11/2007 | Chang |

\* cited by examiner

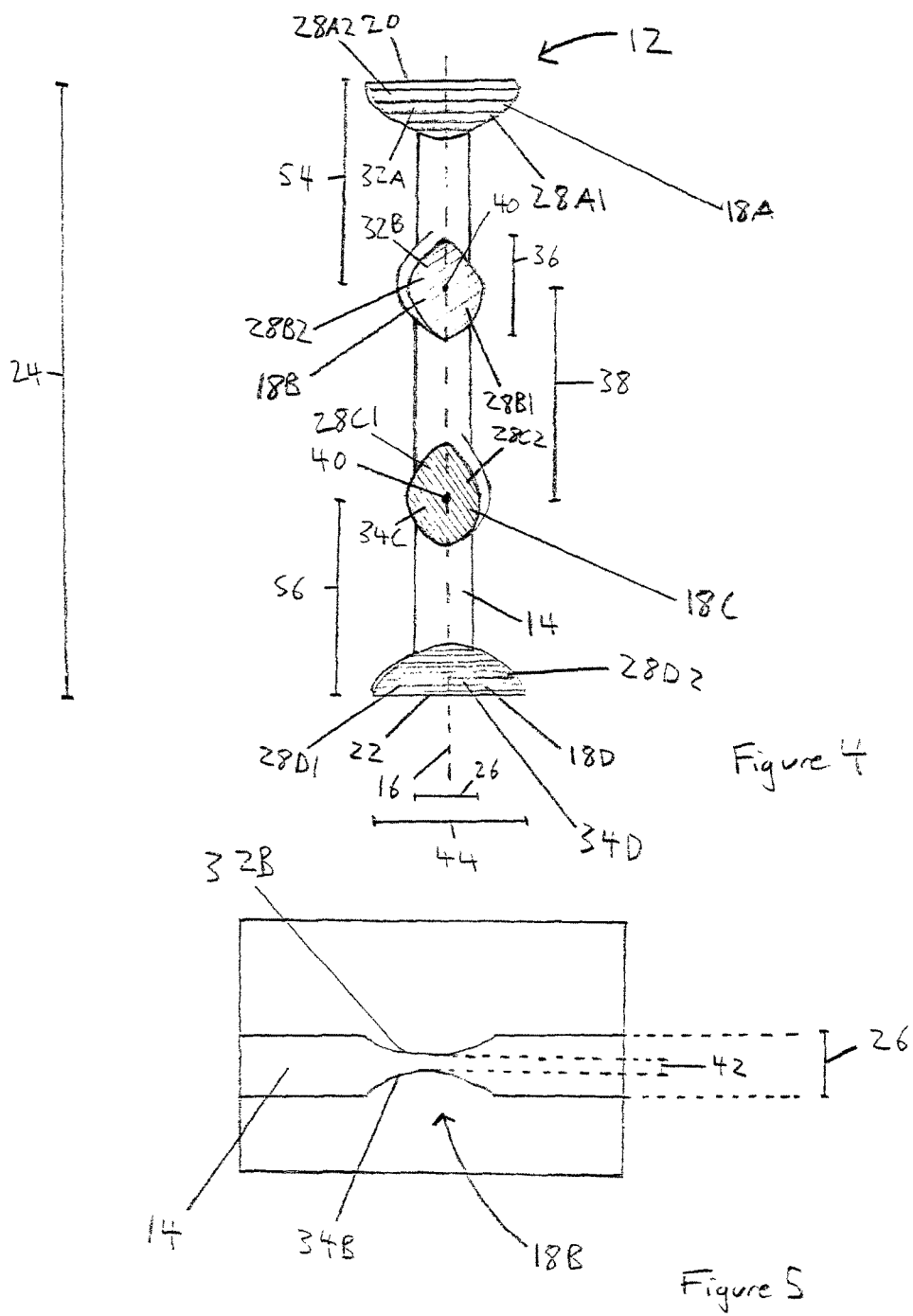

THREE-DIMENSIONALLY DEFORMED FIBER FOR CONCRETE REINFORCEMENT

RELATED APPLICATIONS

This application claims the benefit under 35 U.S.C. 119(e) of U.S. Provisional Patent Application Ser. No. 61/759,067, filed Jan. 31, 2013, which is hereby incorporated by reference.

FIELD OF THE INVENTION

The present invention relates to concrete reinforcing members that are mixed into concrete to enhance the toughness and energy absorption capacity thereof.

BACKGROUND OF THE INVENTION

Concrete is a relatively brittle material that exhibits poor tensile strength. A known way to enhance the toughness and energy absorption capacity of concrete is to disperse short fibers, often made from steel, throughout the concrete. The fibers are typically provided with one or more deformations that allow them to more effectively anchor in the cement matrix.

A typical fiber construction is shown for example in U.S. Pat. No. 5,215,830 issued Jun. 1, 1993 to Cinti. Cinti discloses a fiber with a substantially straight central portion and two end portions that are laterally offset from the central portion. The end portions are both offset towards the same side of the fiber.

An alternative arrangement is disclosed in U.S. Pat. No. 5,451,471 issued Sep. 19, 1995 to Over et al. The fiber disclosed in Over et al. has flattened portions arranged along its length. The flattened portions are shown as being coplanar, although the patent suggests that they could instead be alternately rotated a quarter turn. Over et al. does not suggest rotating the flattened portions at any angles other than 90 degrees, and no indication is given as to whether the disclosed 90 degree rotation would have any advantageous effects. Nor does the patent provide any test results in this regard.

SUMMARY OF THE INVENTION

It is an object of the present invention to provide an improved concrete reinforcing member construction. The invention pertains to concrete reinforcing members that are elongated along an axis, and which have anchoring deformations that extend radially away from the axis. In particular, the invention is directed to constructions wherein these anchoring deformations are arranged to be offset from one another about the axis at an angle that is greater than 0 degrees and less than 90 degrees. It has been found that such concrete reinforcing members can be highly effective in controlling crack nucleation and propagation.

Accordingly, in one aspect the present invention resides in a concrete composite comprising a concrete matrix and a plurality of concrete reinforcing members, each said concrete reinforcing member comprising: a body extending in a longitudinal direction along an axis, and having a lateral width; and a plurality of axially spaced anchor segments integrally formed with the body, each said anchor segment having at least one lateral extension projecting in a lateral direction along an associated plane that extends radially relative to the axis of the body, the lateral extensions sized for anchoring the concrete reinforcing member against relative axial movement following solidification of said concrete matrix; the associated plane of the lateral extension of a first said anchor segment being offset radially about the axis at an angle of between about ±15° to 75° relative to the associated plane of the lateral extension of a second said anchor segment.

Preferably, each of said anchor segments comprises: a first said lateral extension and a second said lateral extension, each said lateral extension extending outwardly from the axis to a respective distal peripheral edge; the first and second lateral extensions defining a pair of generally planar or generally concave major surfaces; wherein the first and second lateral extensions are substantially coplanar.

In one preferred embodiment, the associated plane of the first lateral extension of each said anchor segment is offset radially about the axis at an angle of between about ±30° to 60° relative to the associated plane of the first lateral extension of each adjacent one of said anchor segments.

In another preferred embodiment, each said concrete reinforcing member has a first axial end and a second axial end, and the associated plane of the first lateral extension of each said anchor segment, excluding the anchor segment that is closest to the second axial end of the concrete reinforcing member, is offset radially about the axis at an angle of between about +30° to 60° relative to the associated plane of the first lateral extension of each next consecutive one of said anchor segments that is positioned axially closer to the second axial end of the concrete reinforcing member.

Most preferably, the angle at which the associated plane of the lateral extension of the first anchor segment is offset radially about the axis relative to the associated plane of the lateral extension of the second anchor segment is about ±45°.

In one embodiment, the concrete reinforcing members are formed from steel; the concrete reinforcing members each have an axial length of about 10 mm to 100 mm; the body of each of the concrete reinforcing members is cylindrical and has a diameter of about 0.1 mm to 3 mm; the concrete reinforcing members each have two to four of said anchor segments, each of said anchor segments having an axial length that is about 4 to 12 times the diameter of the body; each of said anchor segments has a respective axial center point, an axial distance between the respective axial center points of consecutive ones of said anchor segments being about ¼ to ⅛ of the axial length of the concrete reinforcing member; for each said anchor segment, a minimum distance between the major surfaces is less than ¼ of the diameter of the body; and, for each said anchor segment, a maximum distance between the respective distal peripheral edges of the first lateral extension and the second lateral extension is about 1.1 to 3.0 times the diameter of the body.

The solidified concrete matrix may be selected as having a cured matrix strength of between about 35 MPa to 45 MPa.

Preferably, the concrete reinforcing members are uniformly distributed and randomly oriented throughout the concrete composite, and make up between about 0.1% to 3% of the concrete composite by volume.

In another aspect, the present invention resides in a concrete reinforcing member for admixture into a concrete composite, comprising: a body extending in a longitudinal direction along an axis, and having a lateral width; and at least two anchor segments axially spaced on the body, each said anchor segment having a first lateral extension and a second lateral extension, the lateral extensions each projecting out from the body to respective distal peripheral edges along an associated plane that extends radially relative to the axis of the body, the lateral extensions sized for anchoring the reinforcing member against relative axial movement following solidification of said concrete composite; the associated plane of the first lateral extension of one said anchor segment being offset radially about the axis at an angle of between about 30° to 60° relative to the associated plane of the first lateral extension of another said anchor segment.

In a preferred embodiment, the first lateral extension and the second lateral extension are substantially coplanar.

Preferably, the first and second lateral extensions define a pair of major surfaces that are generally planar or generally concave, and are free of protuberances.

A maximum distance between said major surfaces, measured along a line that runs perpendicular to the associated plane of the first lateral extension, is preferably less than the lateral width of the body.

In some embodiments, the anchor segments are formed by compressing selected axially spaced portions of the body.

Most preferably, the angle at which the associated plane of the first lateral extension of said one anchor segment is offset radially about the axis relative to the associated plane of the first lateral extension of said another anchor segment is about 45°.

Optionally, the concrete reinforcing member has at least three of said anchor segments, and the associated plane of the first lateral extension of a further said anchor segment is offset radially about the axis at an angle of greater than 0° and less than 180° relative to the associated plane of the first lateral extension of said one anchor segment, and the associated plane of the first lateral extension of said further anchor segment is offset radially about the axis at an angle of greater than 0° and less than 180° relative to the associated plane of the first lateral extension of said another anchor segment.

In some preferred embodiments, the anchor segments are spaced from axial ends of the body.

In one embodiment, the body is cylindrical and has a diameter of about 0.1 mm to 3 mm; the concrete reinforcing member has an axial length of about 10 mm to 100 mm; the concrete reinforcing member has two to four of said anchor segments, each of said anchor segments having an axial length that is about 4 to 12 times the diameter of the body; each of said anchor segments has a respective axial center point, an axial distance between the respective axial center points of consecutive ones of said anchor segments being about ¼ to ⅛ of the axial length of the concrete reinforcing member; for each said anchor segment, a minimum distance between said major surfaces is less than ¼ of the diameter of the body; and, for each said anchor segment, a maximum distance between the respective distal peripheral edges of the first lateral extension and the second lateral extension is about 1.1 to 3.0 times the diameter of the body.

In one exemplary embodiment, the concrete reinforcing member is a steel fiber and has four of said anchor segments, said one anchor segment being positioned at a first axial end of the concrete reinforcing member; said another anchor segment being adjacent to said one anchor segment, the angle at which the associated plane of the first lateral extension of said one anchor segment is offset radially about the axis relative to the associated plane of the first lateral extension of said another anchor segment being about 45°; a further said anchor segment being adjacent to said another anchor segment, the associated plane of the first lateral extension of said further anchor segment being offset radially about the axis at an angle of about 90° relative to the associated plane of the first lateral extension of said another anchor segment; and a final said anchor segment being adjacent to said further anchor segment and positioned at a second axial end of the concrete reinforcing member, the associated plane of the first lateral extension of said final anchor segment being offset radially about the axis at an angle of about 45° relative to the associated plane of the first lateral extension of said further anchor segment.

The concrete reinforcing member is optionally formed from a metal, a polymer, or a ceramic.

In a further aspect, the present invention resides in a concrete reinforcing member, comprising: a body extending in a longitudinal direction along an axis, and having a lateral width; and at least two anchor segments axially spaced on the body, each said anchor segment having at least one lateral extension projecting in a lateral direction along an associated plane that extends radially relative to the axis of the body; the associated plane of the lateral extension of one said anchor segment being offset radially about the axis at an angle of greater than 0° and less than 90° relative to the associated plane of the lateral extension of another said anchor segment.

BRIEF DESCRIPTION OF THE DRAWINGS

Reference may now be made to the following detailed description taken together with the accompanying drawings in which:

FIG. 4 shows a perspective view of a concrete reinforcing member according to a second preferred embodiment of the invention;

FIG. 5 shows a side view of an anchor segment of the concrete reinforcing member of FIG. 4;

DETAILED DESCRIPTION OF THE PREFERRED EMBODIMENTS

Figure 1:
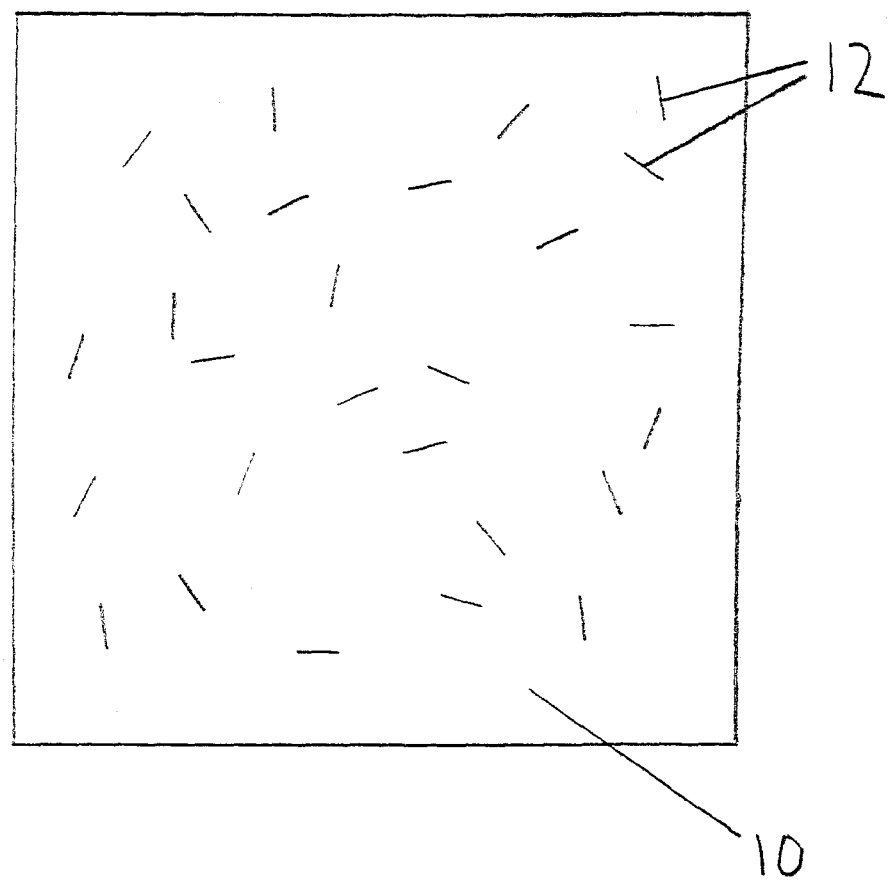
FIG. 1 shows a top view of a concrete structure with concrete reinforcing members dispersed therein.

Reference may first be had to FIG. 1, which depicts a sample cured concrete structure 10 formed from a solidified concrete composite having a plurality of concrete reinforcing members 12 dispersed therein. The concrete composite is selected such that, prior to curing, it is a viscous fluid that can be poured into a desired form before it hardens. The concrete reinforcing members 12 are used to improve the structural integrity of the concrete structure 10. In particular, the concrete reinforcing members 12 impede crack nucleation and growth, and improve toughness, energy absorption capacity, long term durability, impact resistance and fatigue endurance. Preferably, the concrete reinforcing members 12 are uniformly distributed throughout the concrete structure 10 and are randomly oriented. This is achieved by thoroughly mixing the concrete reinforcing members 12 into the concrete composite prior to curing.

The concrete reinforcing members 12 make up about 0.1% to 3% of the concrete composite by volume. The concrete composite also includes a concrete matrix formed from an aggregate material such as crushed rocks, gravel, or sand; a cementitious material such as Portland cement; and water. A person skilled in the art would be very familiar with the different components that could be used to produce the concrete composite, and would select appropriate components based on availability, cost, suitability, and any other relevant considerations. The skilled person would also be familiar with various additives that could also be used to impart the concrete with desired properties, such as chemicals that accelerate or decelerate hardening, or pigments that provide an aesthetically pleasing color.

Figure 2:
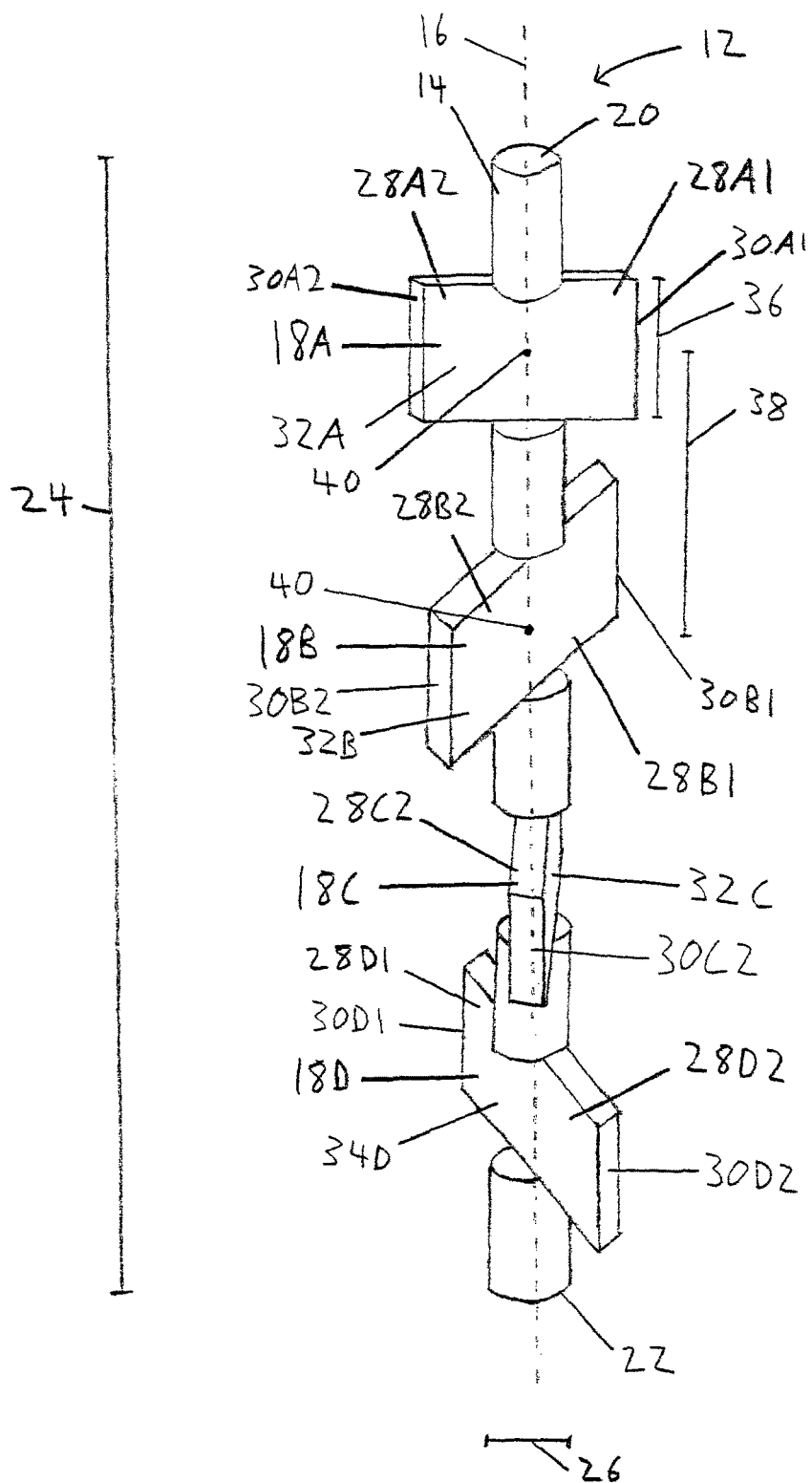
FIG. 2 shows a perspective view of a concrete reinforcing member according to a first preferred embodiment of the invention.

A concrete reinforcing member 12 according to a first preferred embodiment of the invention is depicted in FIG. 2. The concrete reinforcing member 12 is formed as a unitary steel construction comprising a body 14 that extends longitudinally along an axis 16, and four anchor segments 18A, 18B, 18C, and 18D that are axially spaced on the body 14. The anchor segments 18A, 18B, 18C, 18D are for anchoring the concrete reinforcing member 12 in the concrete matrix, as will be described in more detail below.

The body 14 is cylindrical and has a first axial end 20, a second axial end 22, and an axial length 24 of about 10 mm to 100 mm, and preferably 20 mm to 60 mm. Most preferably, the axial length 24 is about 50 mm. The length 24 is selected to permit the concrete reinforcing members 12 to disperse well in the concrete matrix without breaking, and to adequately bridge cracks which may ultimately form in the concrete structure 10.

The diameter 26 of the body 14 is selected at about 0.1 mm to 3 mm, and preferably 1 mm to 3 mm. The diameter 26 is selected to ensure that the concrete reinforcing member 12 is sufficiently robust that it can provide the desired enhancement of toughness and energy absorption. A diameter 26 of 1 mm to 3 mm may be particularly preferred in some circumstances, as this larger diameter 26 makes the concrete reinforcing member 12 easier to handle and manipulate, and as such results in easier manufacturing.

The anchor segments 18A, 18B, 18C, 18D may be integrally formed with the body 14, although this is not essential. Each of the anchor segments 18A, 18B, 18C, 18D has a pair of coplanar lateral extensions 28A1, 28A2, 28B1, 28B2, 28C1, 28C2, 28D1, 28D2 that project out from the body 14 to a respective distal peripheral edge 30A1, 30A2, 30B1, 30B2, 30C1, 30C2, 30D1, 30D2. Each pair of lateral extensions 28A1, 28A2, 28B1, 28B2, 28C1, 28C2, 28D1, 28D2 define a first generally planar major surface 32A, 32B, 32C, 32D and a second generally planar major surface 34A, 34B, 34C, 34D that span between the respective distal peripheral edges 30A1, 30A2, 30B1, 30B2, 30C1, 30C2, 30D1, 30D2 of the lateral extensions 28A1, 28A2, 28B1, 28B2, 28C1, 28C2, 28D1, 28D2.

Preferably, the first and second major surfaces 32A, 32B, 32C, 32D, 34A, 34B, 34C, 34D are generally smooth and free of any protuberances. Anchor segments 18A, 18B, 18C, 18D with smooth first and second major surfaces 32A, 32B, 32C, 32D, 34A, 34B, 34C, 34D can be much more easily manufactured compared with embodiments wherein there are projections that extend from the major surfaces 32A, 32B, 32C, 32D, 34A, 34B, 34C, 34D. Furthermore, having projections that extend out from the major surfaces 32A, 32B, 32C, 32D, 34A, 34B, 34C, 34D could possibly result in an excessively strong bond between the concrete reinforcing member 12 and the concrete matrix. If this bond is too strong, the concrete reinforcing member 12 could fracture, losing its crack bridging capability.

The lateral extensions 28A1, 28A2, 28B1, 28B2, 28C1, 28C2, 28D1, 28D2 are sized for anchoring the concrete reinforcing member 12 against relative axial movement following solidification of the concrete matrix. The axial length 36 of each anchor segment 18A, 18B, 18C, 18D is about 2 to 20, and preferably about 4 to 12, times the diameter 26 of the body 14; and the axial distance 38 between axial centers 40 of adjacent anchor segments 18A, 18B, 18C, 18D is preferably about ¼ to ⅛ of the axial length 24 of the body 14. The thickness 42 of each anchor segment 18A, 18B, 18C, 18D is less than the diameter 26 of the body 14, and preferably less than ¼ of the diameter 26 of the body 14. The width 44 of each anchor segment 18A, 18B, 18C, 18D is larger than the diameter 26 of the body 14, and preferably about 1.1 to 3.0 times the diameter 26 of the body 14.

The anchor segments 18A, 18B, 18C, 18D are preferably spaced from the first and second axial ends 20, 22 of the body 14. This makes handling the concrete reinforcing members 12 easier, as the axial ends 20, 22 are cylindrical rather than thin and sharp. Furthermore, the additional transitions between the anchor segments 18A, 18B, 18C, 18D and the body 14 that occur when the anchor segments 18A, 18B, 18C, 18D are spaced from the axial ends 20, 22 further enhance anchoring of the concrete reinforcing member 12 in the concrete matrix.

Figure 3:
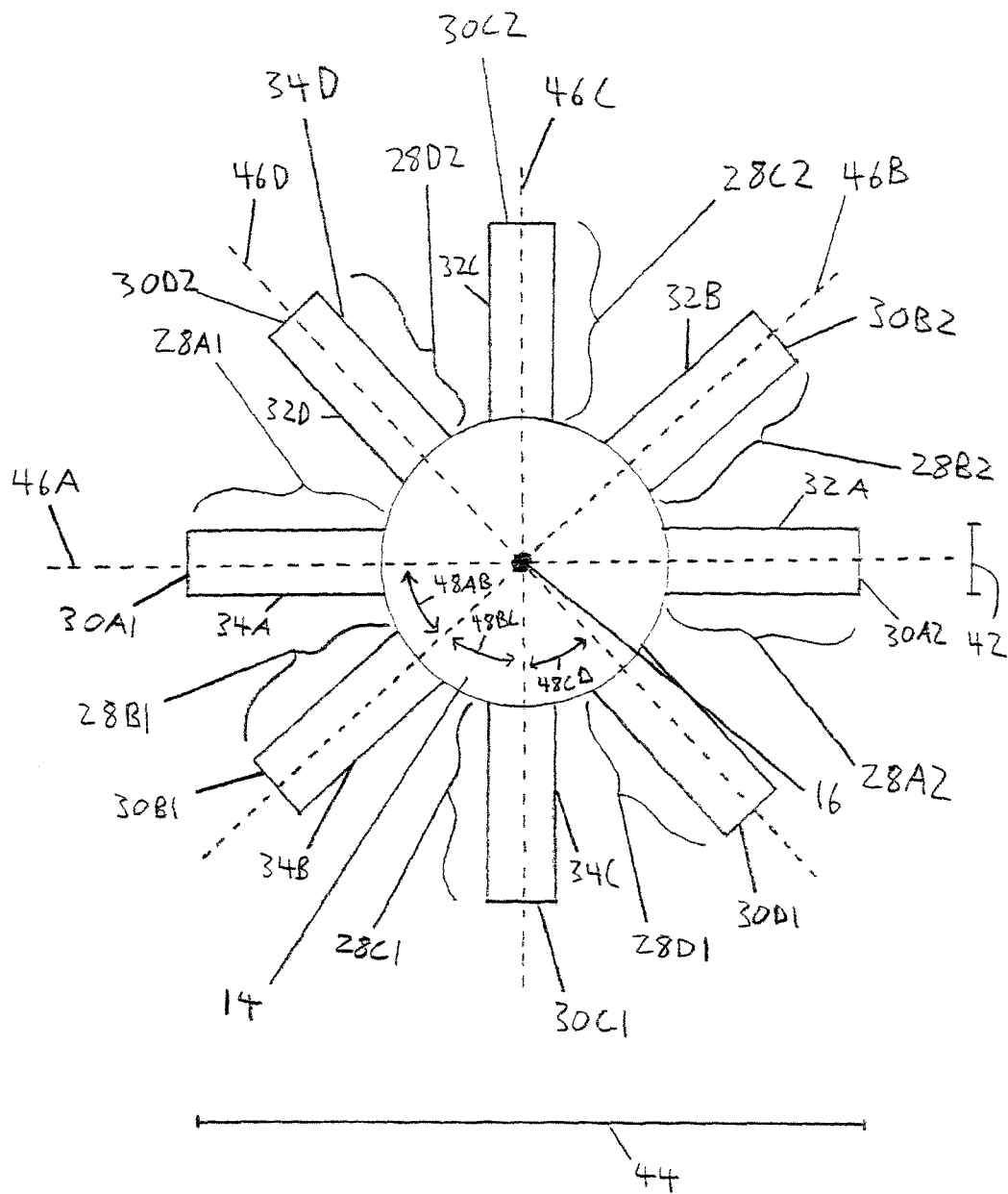
FIG. 3 shows an end view of the concrete reinforcing member of FIG. 1.

As shown in FIG. 3, the lateral extensions 28A1, 28A2, 28B1, 28B2, 28C1, 28C2, 28D1, 28D2 each project out from the body 14 along an associated plane 46A, 46B, 46C, 46D that extends radially relative to the axis 16. The associated plane 46A of lateral extension 28A1 is offset radially about the axis 16 at an angle 48AB of about 45 degrees relative to the associated plane 46B of lateral extension 28B1. The associated plane 46B of lateral extension 28B1 is likewise offset radially about the axis 16 at an angle 48BC of about 45 degrees relative to the associated plane 46C of lateral extension 28C1; and the associated plane 46C of lateral extension 28C1 is likewise offset radially about the axis 16 at an angle 48CD of about 45 degrees relative to the associated plane 46D of lateral extension 28D1.

As described in more detail in the examples below, the applicant has found that concrete reinforcing members 12 such as depicted in FIGS. 1 and 2, wherein lateral extensions 28A1, 28A2, 28B1, 28B2, 28C1, 28C2, 28D1, 28D2 project out from the body 14 in different planes 46A, 46B, 46C, 46D that are radially offset from one another about the axis 16 at angles 48AB, 48BC, 48CD that are greater than 0 degrees and less than 90 degrees, can be highly effective in controlling crack propagation.

A second embodiment of the concrete reinforcing member 12 is shown in FIG. 4, wherein like numerals are used to represent like components. In the embodiment shown in FIG. 4, the anchor segments 18A, 18B, 18C, and 18D have a different shape and orientation from the first embodiment. The anchor segment 18A is positioned at the first axial end 20 of the body 14, and the lateral extensions 28A1 and 28A2 are roughly shaped like a quarter section of a circle. Together, the two lateral extensions 28A1 and 28A2 define first and second major surfaces 32A and 34A that are generally semi-circular. The anchor segment 18D is similarly positioned at the second axial end 22 of the body 14, and has lateral extensions 28D1, 28D2 that are generally shaped like a quarter section of a circle, and define generally semi-circular first and second major surfaces 32D and 34D. The lateral extensions 28B1, 28B2, 28C1, and 28C2 are each semicircular, and define first and second major surfaces 32B, 34B, 32C, and 34C that are generally circular.

Each of the major surfaces 32A, 34A, 32B, 34B, 32C, 34C, 32D, 34D is generally concave. This is shown in respect of anchor segment 18B in FIG. 5. Preferably, the minimum thickness 42 of each anchor segment 18A, 18B, 18C, 18D is less than ¼ the diameter 26 of the body 14. The minimum thickness 42 is selected to be large enough that the concrete reinforcing member 12 is resistant to fracturing, but small enough that the shape of the concrete reinforcing member 12 significantly changes at the anchor segments 18A, 18B, 18C, 18D, so that the concrete reinforcing member 12 effectively anchors in the concrete matrix.

Figure 6:
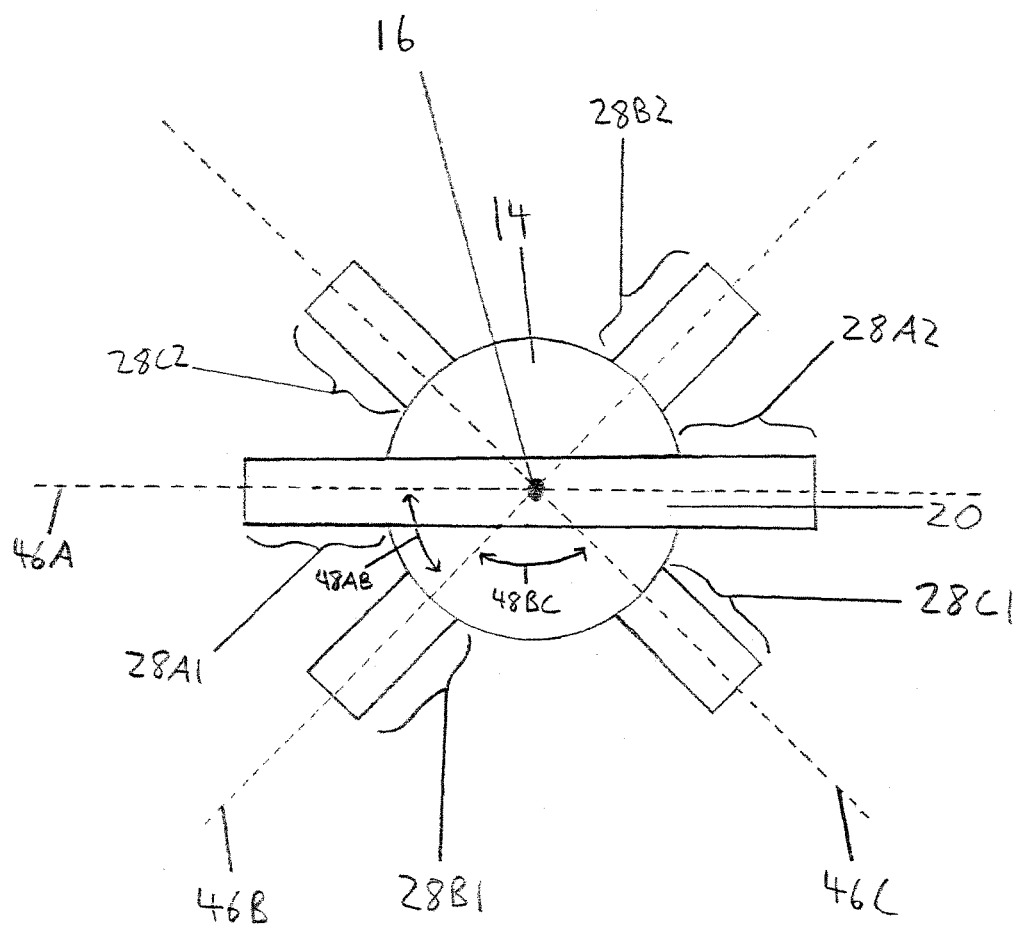
FIG. 6 shows a first end view of the concrete reinforcing member of FIG. 4.
Figure 7:
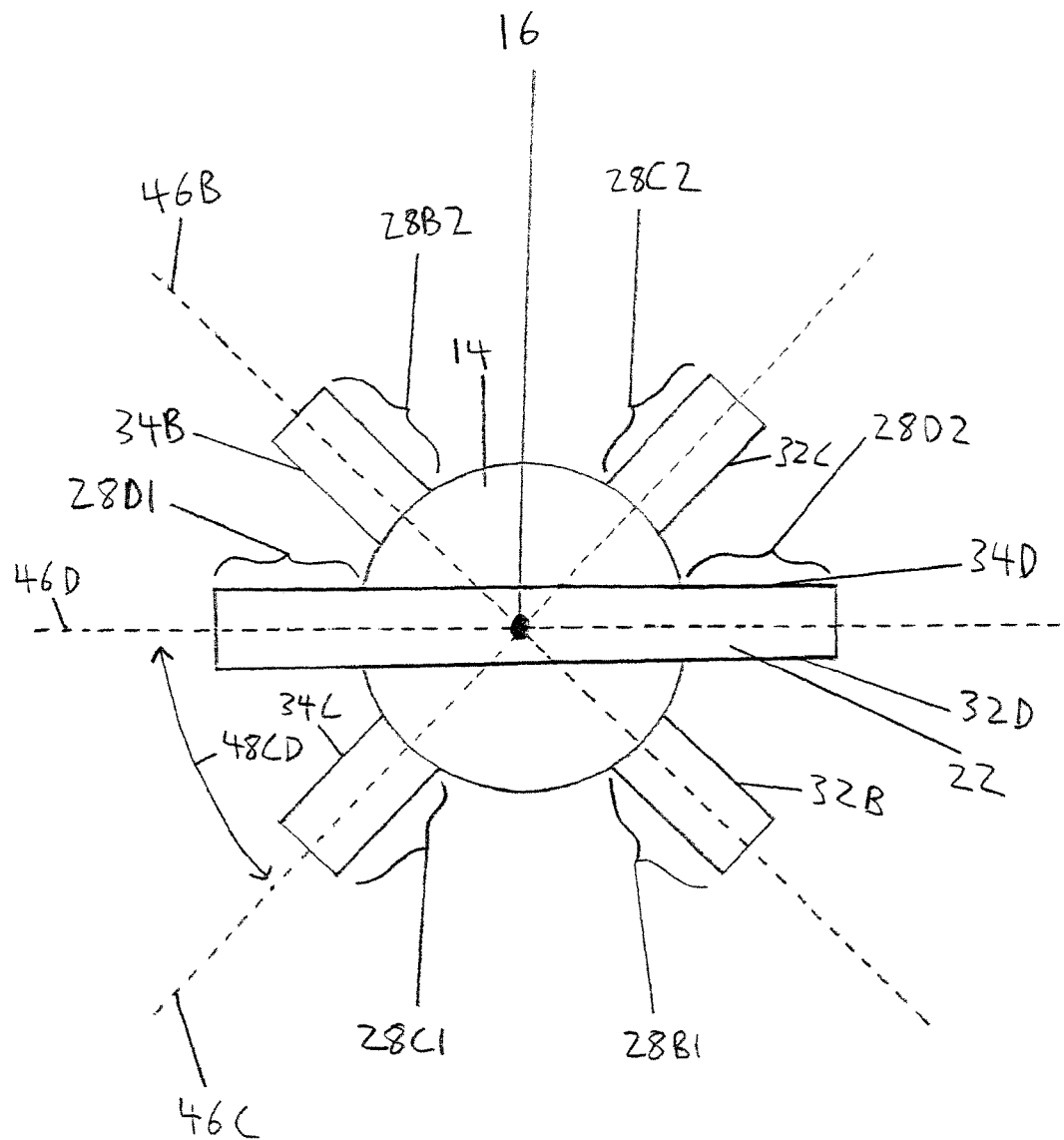
FIG. 7 shows a second end view of the concrete reinforcing member of FIG. 4.

The radial orientation of the lateral extensions 28A1, 28A2, 28B1, 28B2, 28C1, 28C2, 28D1, 28D2 is best shown in FIGS. 6 and 7. As can be seen in FIG. 6, the associated plane 46A of lateral extension 28A1 is offset radially about the axis 16 at an angle 48AB relative to the associated plane 46B of lateral extension 28B1. Preferably, the angle 48AB is 45 degrees. The associated plane 46B of lateral extension 28B1 is offset radially about the axis 16 at an angle 48BC relative to the associated plane 46C of lateral extension 28C1. Preferably, the angle 48BC is about 90 degrees. FIG. 7 best shows that the associated plane 46C of lateral extension 28C1 is offset radially about the axis 16 at an angle 48CD relative to the associated plane 46D of lateral extension 28D1. Preferably, the angle 48CD is about 45 degrees. At least one of angles 48AB, 48BC, 48CD is greater than zero degrees and less than 90 degrees.

Figure 8:
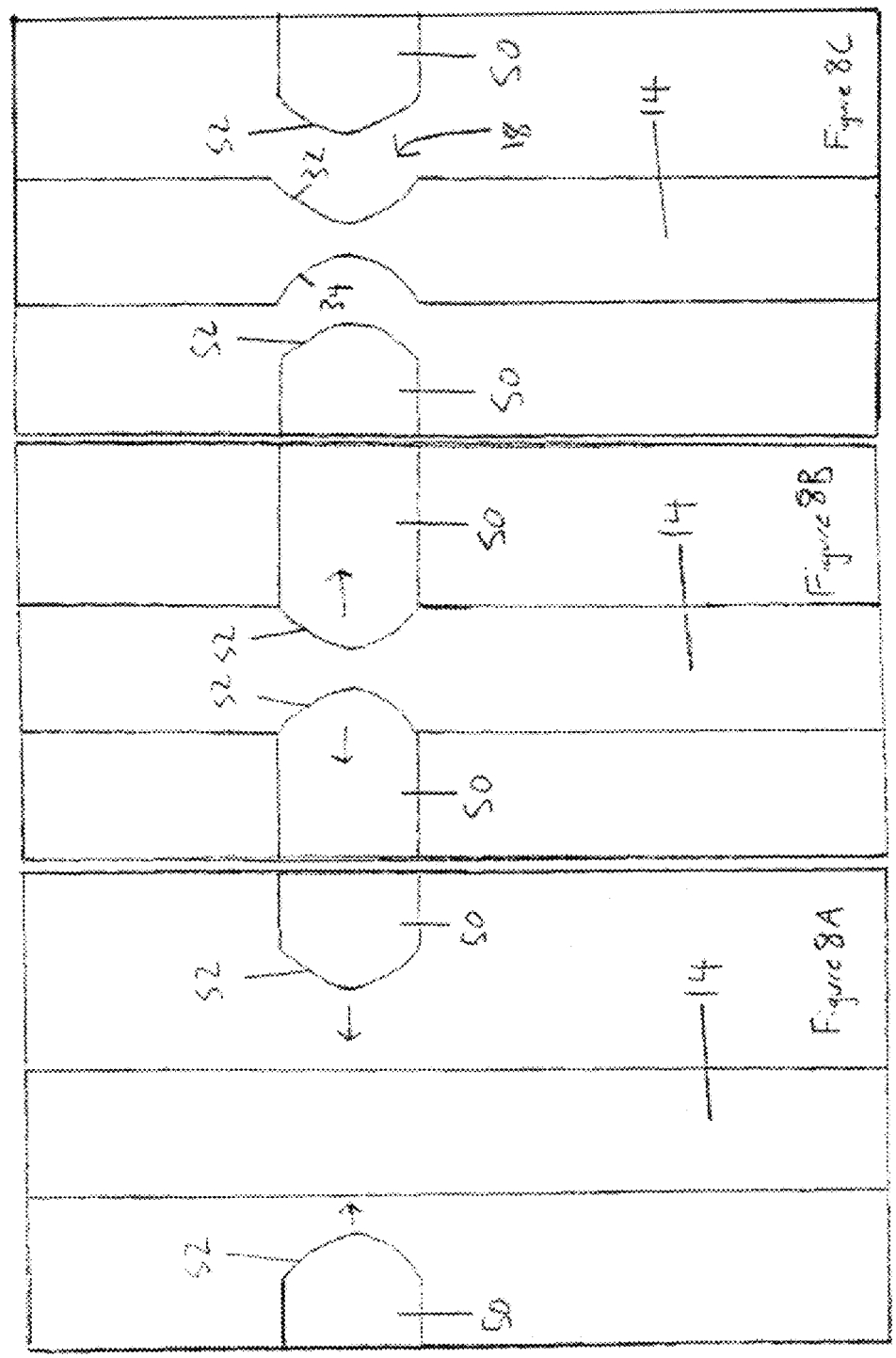
FIGS. 8A-C depict a sequence of steps for forming an anchor segment of the concrete reinforcing member of FIG. 4.

Preferably the anchor segments 18A, 18B, 18C, 18D are integrally formed with the body 14. The anchor segments 18A, 18B, 18C, 18D can be formed by compressing the body 14 with a compressing apparatus such as for example is depicted in FIGS. 8A, 8B, and 8C. As shown in FIG. 8A, the body 14 is arranged between two compressing bars 50. Each compressing bar 50 has a generally convex compressing surface 52 that is arranged facing the body 14. The two compressing bars 50 are pressed into the body 14, causing the body 14 to deform, as shown in FIG. 8B. The compressing bars 50 are then pulled away from the body 14, leaving an anchor segment 18 with generally concave first and second major surfaces 32, 34 formed into the body 14. To produce a further anchor segment 18, the body 14 is moved axially by a predetermined amount, and the process is repeated. Alternatively, the body 14 could remain stationary, and the compressing bars 50 could be axially displaced.

Figure 9:
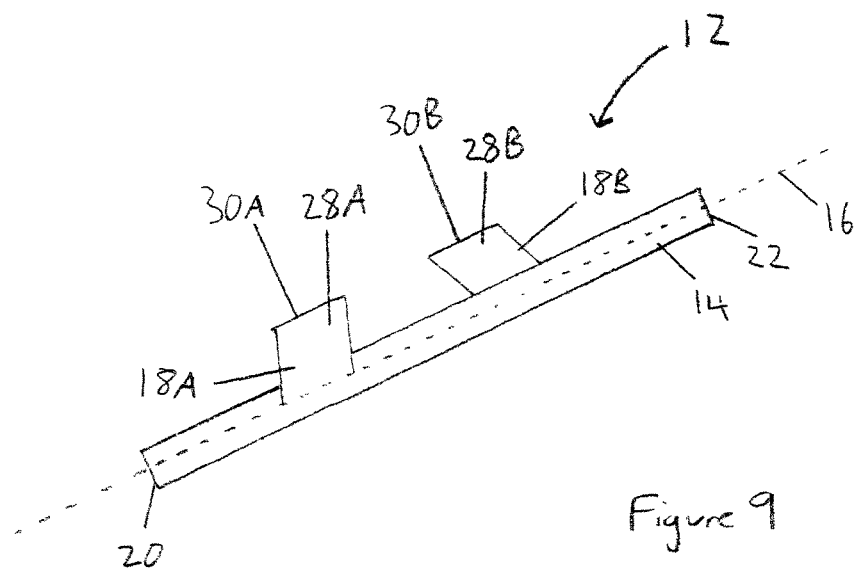
FIG. 9 shows a perspective view of a concrete reinforcing member according to a third preferred embodiment of the invention.
Figure 10:
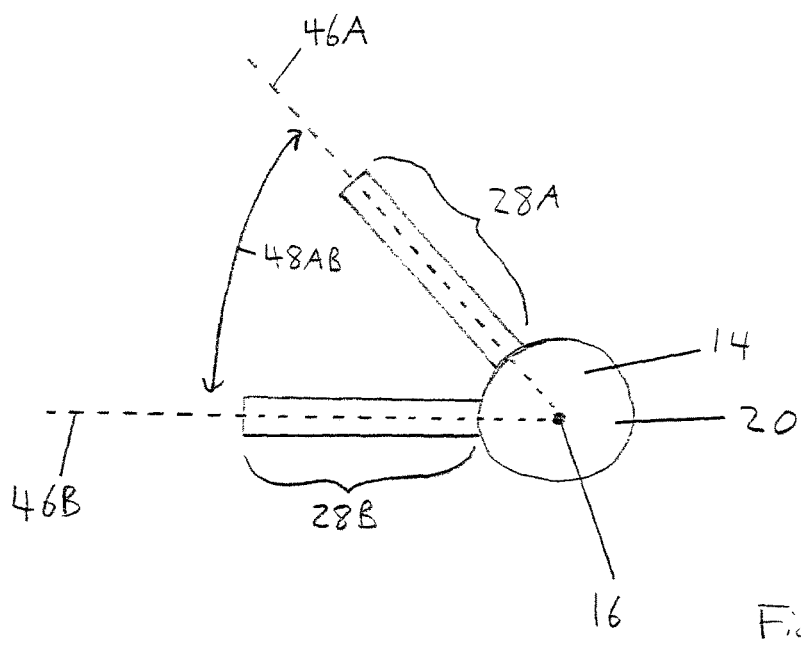
FIG. 10 shows an end view of the concrete reinforcing member of FIG. 9.

A third embodiment of the concrete reinforcing member 12 is shown in FIG. 9, wherein like numerals are used to represent like components. In the embodiment shown in FIG. 9, the concrete reinforcing member 12 has only two anchor segments 18A and 18B. Each anchor segment 18A, 18B furthermore has only a single lateral extension 28A, 28B projecting laterally out from the body 14. As shown in FIG. 10, the associated plane 46A of lateral extension 28A is offset radially about the axis 16 at an angle 48AB relative to the associated plane 46B of lateral extension 28B. The angle 48AB is more than 0 degrees and less than 90 degrees. More preferably, the angle 48AB is between about 15 degrees to 75 degrees. Even more preferably, the angle 48AB is between about 30 degrees to 60 degrees, and most preferably, is about 45 degrees.

Reference may now be made to the following examples, which provide experimental evidence showing the effectiveness of the concrete reinforcing members 12 of the present invention. The examples are provided to give the reader a more complete understanding of the invention, and are not intended to be limiting on the scope of the invention.

EXAMPLES

The bond that develops between a concrete reinforcing member 12 and the surrounding concrete matrix is an important attribute determining the effectiveness of the concrete reinforcing member 12 in controlling nucleation and propagation of cracks, and the overall effectiveness of the concrete reinforcing member 12 in enhancing the toughness and strain capability of the concrete matrix. Deformations of the concrete reinforcing member 12 allow it to more effectively anchor in the concrete matrix, and as a result, most concrete reinforcing members 12 include some type of deformation. However, the concrete reinforcing members 12 must be optimally deformed to provide the desired effects. An excessively deformed concrete reinforcing member 12 will develop too good of a bond with the concrete matrix, and as a result may fracture and lose its entire crack bridging capability.

Concrete reinforcing members 12 are often deformed by compressing the body 14 of the reinforcing member 12 to form a paddle-shaped deformation. Alternatively, reinforcing members 12 are sometimes bent to form a hook or a crimp structure. It has been found that commercially available concrete reinforcing members 12 all have deformations that are arranged in the same plane 46. The inventor of the subject matter described and claimed herein has accordingly undertaken a study to assess the effects of deformations that are set in different planes 46, and to identify the arrangements that are most effective in controlling the nucleation and propagation of cracks. The results of this study are summarized below.

Figure 11:
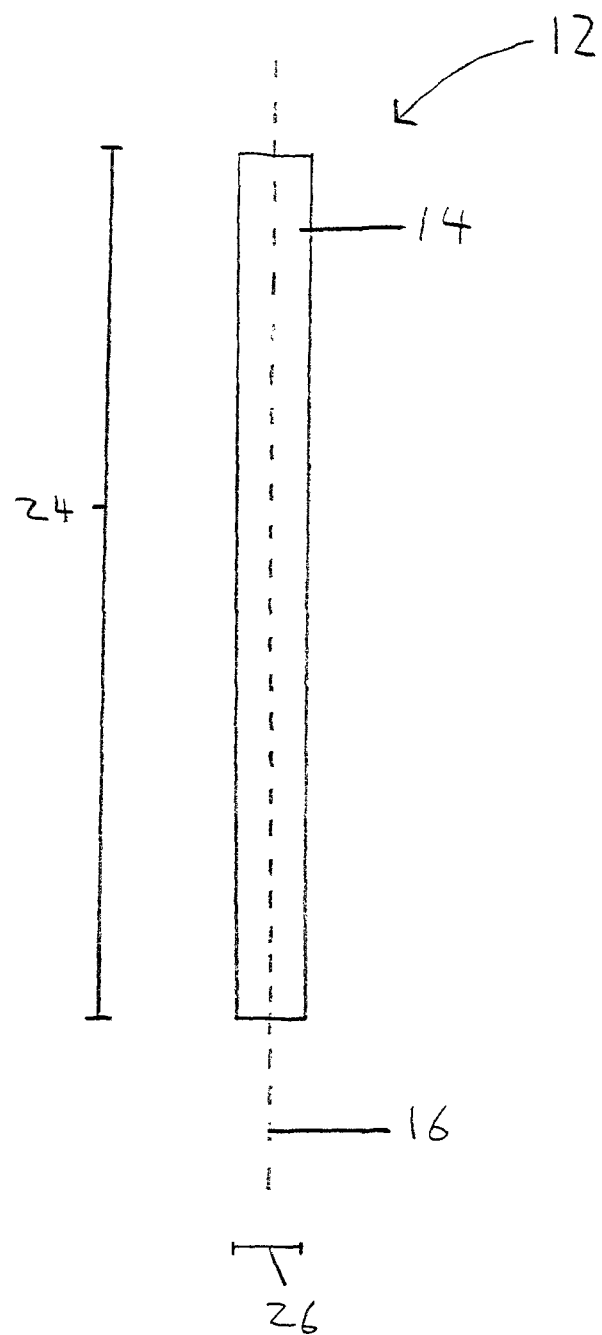
FIG. 11 shows a side view of a concrete reinforcing member that was subjected to a quasi-static pull out test.

Six steel concrete reinforcing members 12 (A, A1, A2, A3, A4, A5) with different geometries were produced and tested. The construction of the first concrete reinforcing member 12 (A) is shown in FIG. 11. This concrete reinforcing member 12 had a cylindrical body 14 that was elongated along the axis 16, and which did not incorporate any anchor segments 18. The other tested concrete reinforcing members 12 (A1, A2, A3, A4, A5) had the general construction shown in FIG. 4, but differed from one another in respect of the axial length 36 of the anchor segments 18A, 18B, 18C, 18D; the width of the anchor segments 18A, 18B, 18C, 18D; and the angles 48AB, 48BC, and 48CD.

Each of the concrete reinforcing members 12 had a diameter 26 of 0.5 mm and an axial length 24 of 50.0 mm. For each of concrete reinforcing members 12 A1, A2, A3, A4 and A5, an axial distance 54 from the first axial end 20 to the axial center point 40 of anchor segment 18B was 12.5 mm; the axial distance 38 between the axial center point 40 of anchor segment 18B and the axial center point 40 of anchor segment 18C was 25.0 mm; and an axial distance 56 from the axial center point 40 of anchor segment 18C to the second axial end 22 was 12.5 mm.

The differences between concrete reinforcing members 12 A1, A2, A3, A4, and A5 are set out in the following tables:

TABLE 1

Size of anchor segments 18A, 18B, 18C, 18D

| Concrete reinforcing member 12 | Axial length 36 of anchor segments 18A and 18D | Axial length 36 of anchor segments 18B and 18C | Width 44 of anchor segments 18A, 18B, 18C, and 18D |
|---|---|---|---|
| A1 | 2.0 mm | 4.0 mm | 1.0 mm |
| A2 | 2.0 mm | 4.0 mm | 1.0 mm |
| A3 | 2.25 mm | 4.5 mm | 1.25 mm |
| A4 | 2.25 mm | 4.5 mm | 1.25 mm |
| A5 | 2.25 mm | 4.5 mm | 1.25 mm |

TABLE 2

Angles 48AB, 48BC, and 48CD

| Concrete reinforcing member 12 | Angle 48AB | Angle 48BC | Angle 48CD |
|---|---|---|---|
| A1 | 0 degrees | 0 degrees | 0 degrees |
| A2 | 90 degrees | 90 degrees | 90 degrees |
| A3 | 0 degrees | 0 degrees | 0 degrees |
| A4 | 90 degrees | 90 degrees | 90 degrees |
| A5 | 45 degrees | 90 degrees | 45 degrees |

Figure 12:
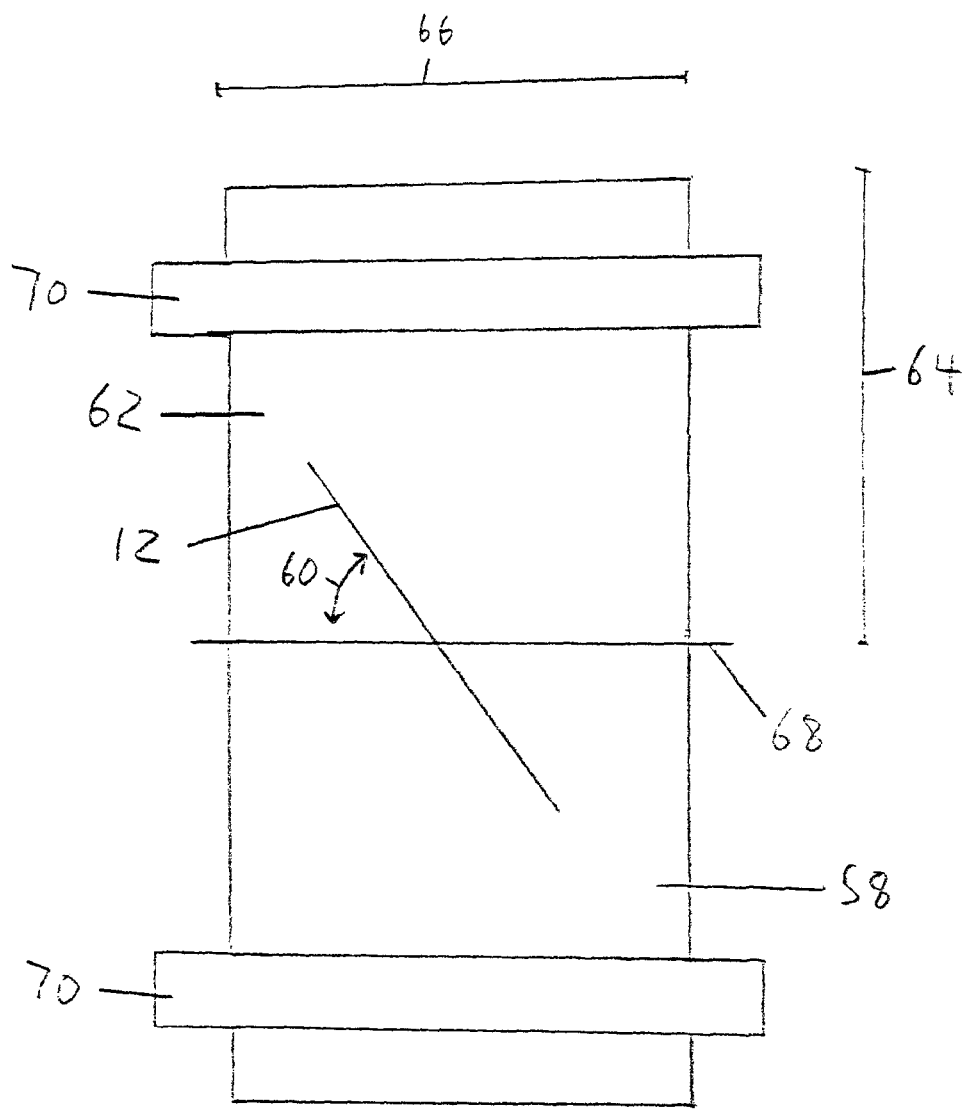
FIG. 12 shows a schematic side view of a specimen configuration for performing a quasi-static pull out test.

Each of the concrete reinforcing members 12 was subjected to a quasi-static pull out test. The configuration for the test is shown in FIG. 12. Initially, a first block of concrete 58 was cast with a concrete reinforcing member 12 embedded therein such that approximately half of the concrete reinforcing member 12 extended out of the first block of concrete 58 at an angle 60 of approximately 45 degrees. 24 hours later, a second block of concrete 62 was cast, with the remaining half of the concrete reinforcing member 12 embedded therein. Each of the first and second blocks of concrete 58, 62 had a height 64 of approximately 63 mm, and a width 66 of approximately 65 mm. The matrix strength of the first and second blocks of concrete 58, 62 was about 40 MPa.

The first and second blocks of concrete 58, 62 were separated by a thin plastic sheet 68 (approximately 0.5 mm thick) with a point sized hole through which the concrete reinforcing member 12 passed. This prevented the formation of a bond between the first and second blocks of concrete 58, 62, and thus simulated a crack that was bridged by the concrete reinforcing member 12. The specimens were then cured for 28 days in lime saturated water until tested.

A universal testing machine with a load capacity of 5 kN was used for the tests. A pull-out load was applied via clamps 70 embedded in the first and second blocks of concrete 58, 62 at a cross-arm travel rate of 2 mm/min, and the applied load v. slip (crack-opening displacement) curves were recorded. The crack-opening displacement was measured by averaging the signals from two linear variable differential transformers (LVDTs) mounted on either side of the specimen. These LVDTs had a travel range of 40 mm and an accuracy of $10^{-3}$ mm. The applied load and crack-opening displacement data were recorded using an acquisition system that operated at a frequency of 2 Hz. The average pull-out responses of concrete reinforcing members 12 A, A1, A2, A3, A4, A5 are compared in FIG. 13.

Figure 14:
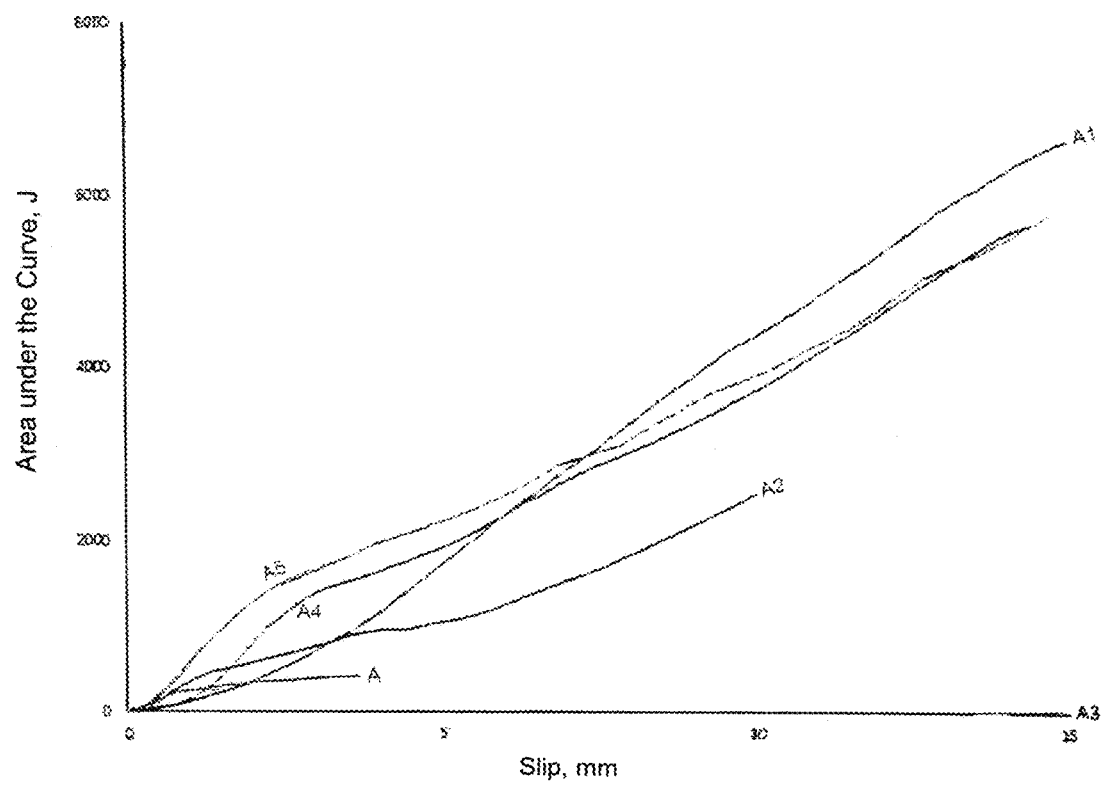
FIG. 14 shows the pull out energy curves to a slip of 15 mm for concrete reinforcing members subjected to a quasi-static pull out test.
Figure 15:
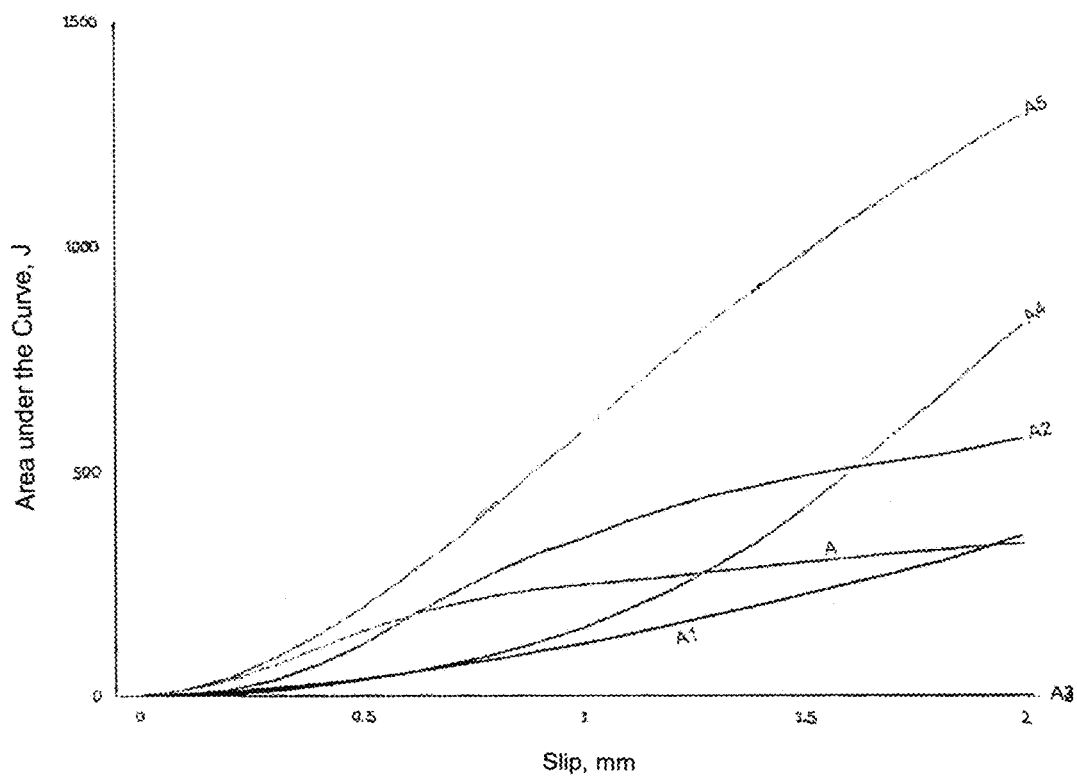
FIG. 15 shows the pull out energy curves to a slip of 2 mm for concrete reinforcing members subjected to a quasi-static pull out test.

The pull-out curves were further integrated to obtain the pull-out energies absorbed by the different reinforcing members 12 to various slip values. Energy absorbed to a slip value of 15 mm is shown in FIG. 14, and energy absorbed to a slip value of 2 mm is shown in FIG. 15. A slip of 2 mm was selected as this is the largest slip expected in a standardized toughness test conducted using ASTM C1609 and a 100 mm×100 mm×300 mm specimen (Armelin, H. S. and Banthia, N., "Predicting the Flexural Post-Cracking Performance of Steel-Fiber Reinforced Concrete from the Pull-Out of Single Fibers", *ACI Material Journal*, 94(1), 1997, pp. 18-31).

Figure 13:
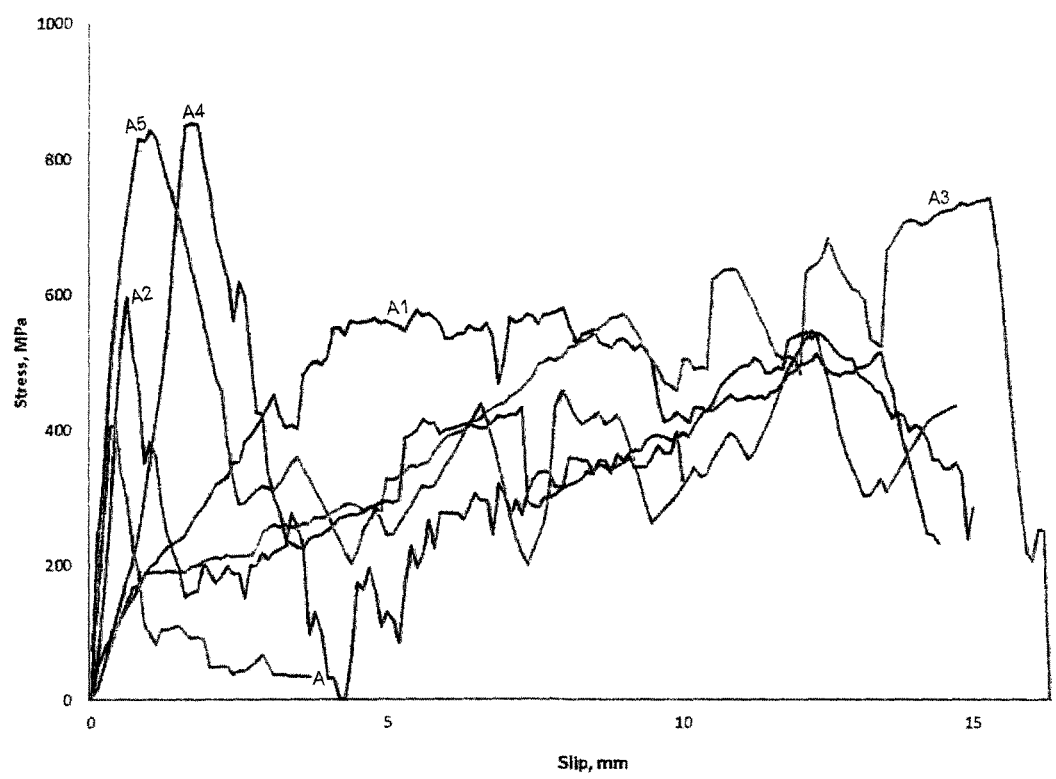
FIG. 13 shows the bond-slip curves for concrete reinforcing members subjected to a quasi-static pull out test.

As can be seen from FIGS. 13 to 15, the concrete reinforcing members 12 A2, A4 and A5, wherein the anchor segments 18A, 18B, 18C, 18D were rotated relative to one another (i.e. had non-zero values for the angles 48AB, 48BC, and 48CD) showed markedly better crack control efficiency at small crack opening displacements. Furthermore, the concrete reinforcing member 12 A5, with angles 48AB and 48CD that were greater than zero degrees and less than 90 degrees, showed significantly better crack control efficiency at small crack opening displacements compared to the concrete reinforcing members 12 A2 and A4, wherein the anchor segments 18A, 18B, 18C, 18D were always rotated 90 degrees relative to one another.

Figure 16:
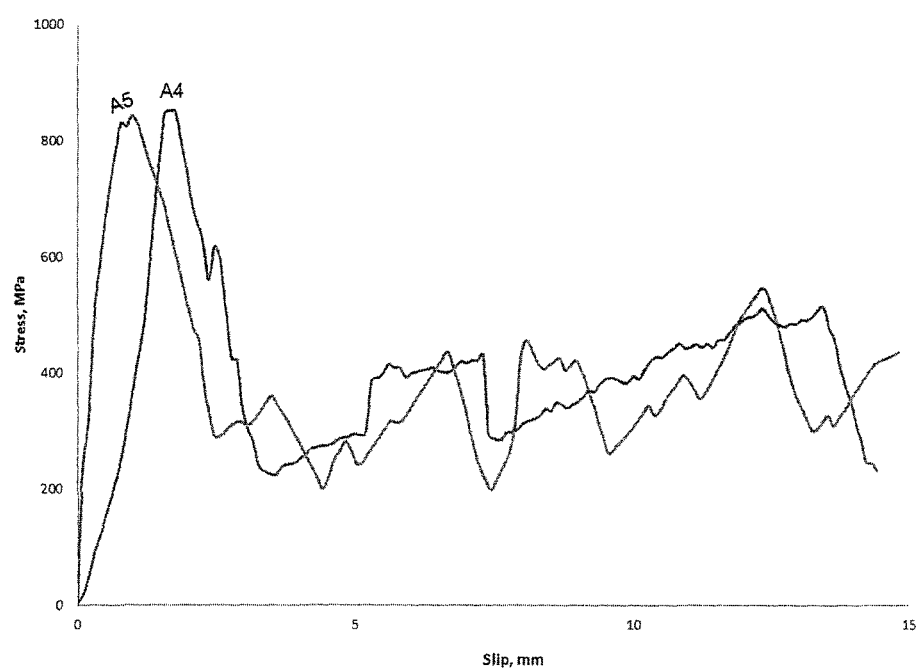
FIG. 16 shows the bond-slip curves for selected concrete reinforcing members subjected to a quasi-static pull out test.
Figure 17:
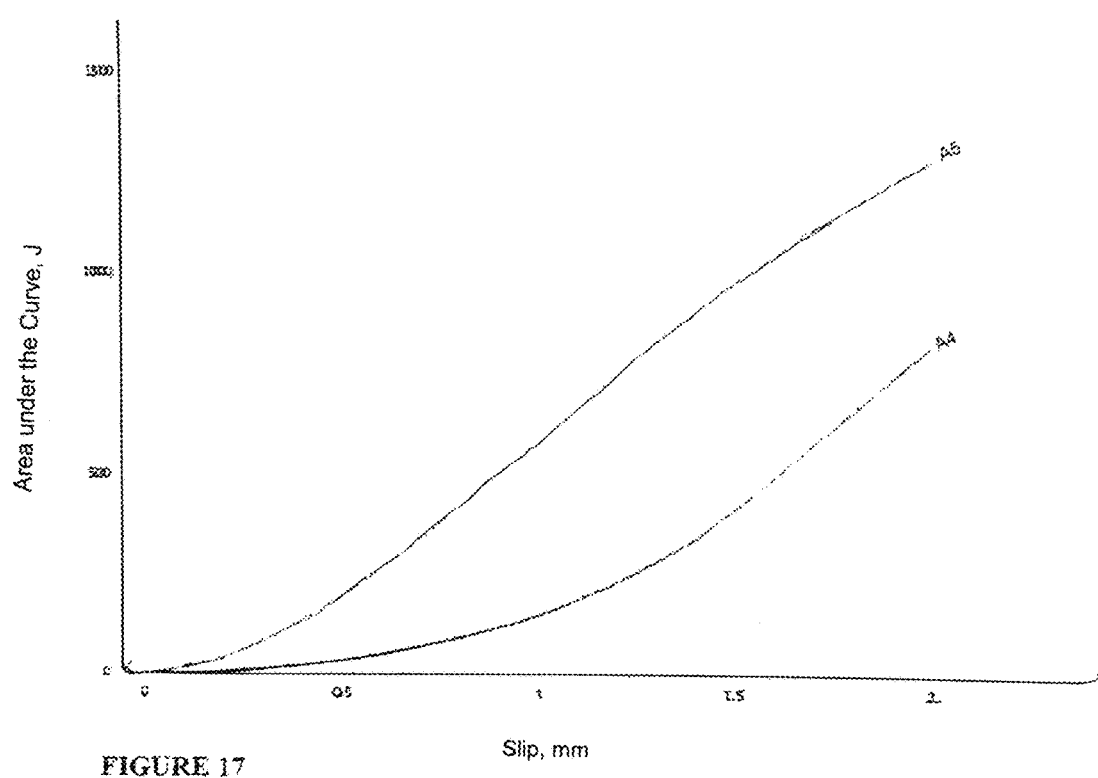
FIG. 17 shows the pull out energy curves to a slip of 2 mm for selected concrete reinforcing members subjected to a quasi-static pull out test.

To better illustrate this finding, the pull-out curves for concrete reinforcing members 12 A4 and A5 are reproduced in FIG. 16, and the energy absorbed to a slip value of 2 mm for concrete reinforcing members 12 A4 and A5 are reproduced in FIG. 17.

These test results show:

i) that concrete reinforcing members 12 with anchor segments 18A, 18B, 18C, 18D that were rotated relative to one another about the longitudinal axis 16 were more effective at controlling cracks at small crack opening displacements compared with concrete reinforcing members 12 with anchor segments 18A, 18B, 18C, 18D that were coplanar; and ii) that concrete reinforcing members 12 with anchor segments 18A, 18B, 18C, 18D that were rotated more than 0 degrees and less than 90 degrees relative to one another were more effective at controlling cracks at small crack opening displacements than concrete reinforcing members 12 with anchor segments 18A, 18B, 18C, 18D that were always rotated 90 degrees relative to one another.

These results are important, as most specifications for reinforced concrete stipulate small deflections (less than 2 mm), and because concrete reinforcing members 12 providing a steep rise in transmitted load at small values of slip are expected to provide much better long term durability.

Although not wishing to be bound by theory, a possible explanation for these results is that anchor segments 18 that are radially offset from one another about the longitudinal axis 16 at angles 48 of greater than zero degrees and less than 90 degrees provide the most optimal transmission of load between the concrete matrix and the concrete reinforcing member 12. For example, this arrangement of anchor segments 18 may be optimally suited for providing an efficiently strong bond between the concrete reinforcing member 12 and the concrete matrix, which causes the anchor segments 18 to be less prone to being pulled through the concrete matrix, and also reduces the likelihood of the concrete reinforcing member 12 fracturing.

Furthermore, having anchor segments 18 that are radially offset in different planes 46 increases the mass of the surrounding concrete matrix that is engaged by the anchor segments 18, and through which stress can be transferred between the concrete matrix and the concrete reinforcing member 12. This concept is illustrated in FIGS. 18 to 21.

Figure 18:
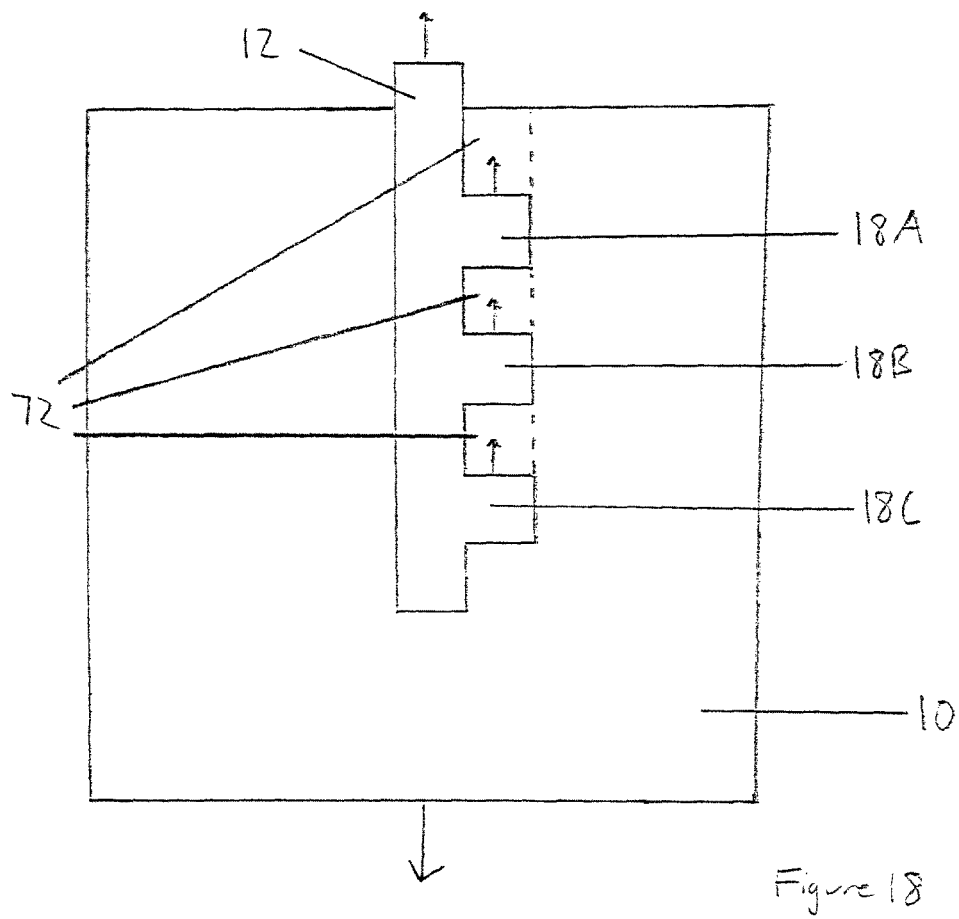
FIG. 18 shows a schematic side view of a concrete reinforcing member being pulled out of a concrete block.
Figure 19:
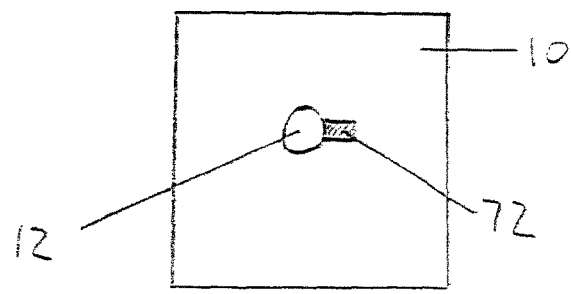
FIG. 19 shows a top view of the concrete reinforcing member and concrete block of FIG. 18.

FIG. 18 shows a concrete reinforcing member 12 with three anchor segments 18A, 18B, 18C that are coplanar. The concrete reinforcing member 12 is embedded in a concrete structure 10, and is subjected to a pull-out force. As shown by the dotted lines, only a relatively small proportion 72 of the concrete structure 10 is directly engaged by the anchor segments 18A, 18B, 18C, and thus available for the transfer of stress between the concrete reinforcing member 12 and the concrete matrix. A top view of the concrete structure 10 showing the proporation 72 of the surrounding concrete matrix that is engaged by the anchor segments 18A, 18B, 18C is provided in FIG. 19.

Figure 20:
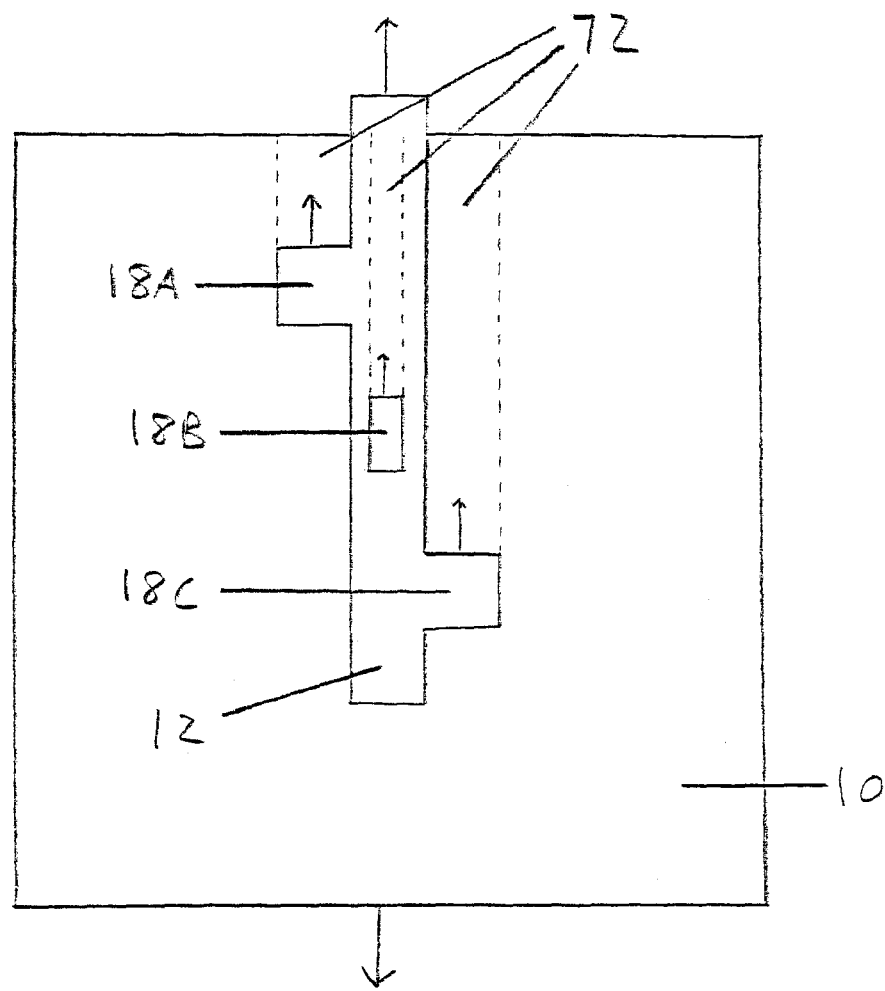
FIG. 20 shows a schematic side view of a concrete reinforcing member being pulled out of a concrete block.
Figure 21:
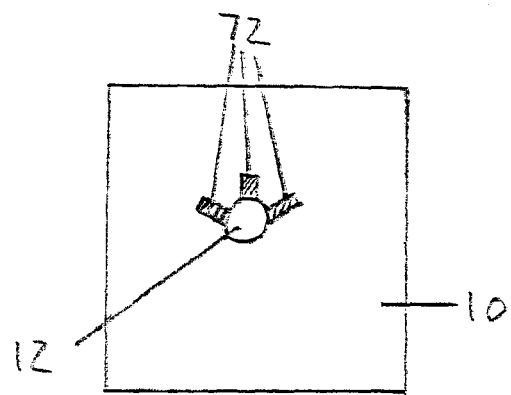
FIG. 21 shows a top view of the concrete reinforcing member and concrete block of FIG. 20.

FIG. 20 shows an alternative arrangement of the concrete reinforcing member 12 wherein the three anchor segments 18A, 18B, 18C are not coplanar. As can be seen, the proportion 72 of the concrete structure 10 that is engaged by the anchor segments 18A, 18B, 18C is significantly increased. As such, this construction of the concrete reinforcing member 12 can more efficiently distribute the load transferred between the concrete reinforcing member 12 and the concrete matrix, providing a stronger bond that can absorb greater energy. Furthermore, by engaging the concrete matrix at multiple different anchor segments 18A, 18B, 18C that are each, individually, only engaging with a relatively small mass of the concrete matrix, this construction avoids a situation in which the bond at a single anchor segment 18A, 18B, 18C is so strong that the concrete reinforcing member 12 ends up fracturing. This might occur, for example, if a concrete reinforcing member 12 had an anchor segment 18 that was constructed to laterally extend from the body 14 in all directions, and not just in a single plane 46.

Constructions wherein the anchor segments 18 are radially offset from one another about the axis 16 at angles 48 that are greater than 0 degrees and less than 90 degrees are best able to take advantage of the concept described above. For example, arranging four anchor segments 18A, 18B, 18C, 18D to each be radially offset about the axis 16 by 45 degrees relative to the next adjacent anchor segment 18A, 18B, 18C, or 18D results in a configuration wherein the anchor segments 18A, 18B, 18C, 18D are arranged in four different planes 46A, 46B, 46C, 46D (as shown, for example, in FIG. 3). In contrast, if the anchor segments 18A, 18B, 18C, 18D were each radially offset about the axis 16 by 90 degrees relative to the next adjacent anchor segment 18A, 18B, 18C, 18D, the anchor segments 18A, 18B, 18C, 18D would only sit in two different planes 46A and 46C or 46B and 46D.

An additional advantage of having anchor segments 18 that are radially offset in different planes 46 is that, should the concrete reinforcing member 12 begin to slip, the anchor segments 18 will traverse through the concrete matrix along different paths from one another. In contrast, when the anchor segments 18 are all arranged in the same plane 46, as the concrete reinforcing member 12 slips, successive anchor segments 18 slide past the same matrix points that have already been previously damaged or split by the preceding anchor segments 18. This results in a continual reduction in the amount of load that can be supported by the concrete reinforcing member 18 as it is pulled out.

Arranging the anchor segments 18 in different planes 46 mitigates this problem. Furthermore, constructions wherein the anchor segments 18 are radially offset from one another about the axis 16 at angles 48 that are greater than 0 degrees and less than 90 degrees can be more effective at mitigating this problem in comparison with constructions where the offset angle 48 is always 90 degrees. In particular, the former constructions allow the anchor segments 18 to be arranged in many different planes 46, while in the latter constructions the anchor segments 18 can only be arranged in two perpendicular planes 46.

While the concrete reinforcing members 12 have been described in the preferred embodiments as being constructed from steel, this is not essential. Rather, a skilled artisan would appreciate that a variety of different materials might be suitable, depending on the desired properties of the concrete structure 10. These materials might include, for example, any suitable metal, polymer, or ceramic.

A skilled artisan will appreciate that, depending on the construction processes that are used, the concrete reinforcing members 12 may contain small imperfections. For example, it is possible that the anchor segments 18 could be slightly misaligned from their intended orientation, or could have slightly different dimensions from those that are intended. Concrete reinforcing members 12 having such minor imperfections would still be effective, and fall within the scope of the invention.

It is to be understood that the present invention is not limited to any particular composition of the concrete matrix. Rather, any suitable combination of aggregate material and cementitious material could be used, with any additional additives that may be desired. The solidified concrete matrix could be selected to have a relatively low cured matrix strength or a relatively high cured matrix strength, as desired, and could for example have a cured matrix strength of between about 10 MPa to 200 MPa A skilled artisan will appreciate that the concrete composite could be in a form that is intended to be shotcreted rather than poured, if desired. Furthermore, the concrete reinforcing members 12 may be added to the concrete composite at a location that is remote from a construction site, and then transported to the construction site before being poured or shotcreted. Alternately, the concrete reinforcing members 12 could be added to the concrete composite at the construction site itself.

The concrete composite may be used for any desired construction applications, such as to produce slabs on grade, architectural panels, precast products, off-shore structures, structures in seismic regions, thin and thick repairs, crash barriers, footings, hydraulic structures, and any other concrete structure 10 that may be desired.

The concrete reinforcing members 12 of the present invention are not limited to any particular method of manufacture. Rather, any suitable process could be used for producing concrete reinforcing members 12 having the described geometries. Furthermore, a skilled artisan would be very familiar with the various manufacturing processes that could be used to produce a concrete reinforcing member 12. For example, one optional way to produce the concrete reinforcing members 12 is to pull a thin steel wire through a processing machine which chops the wire into pieces which form the body 14, and which periodically compresses the body 14 to form the anchor segments 18 with the desired shape and orientation.

It is to be appreciated that the concrete reinforcing members 12 do not have to have the specific dimensions of the preferred embodiments that have been described and illustrated. Furthermore, it is to be appreciated that the body 14 does not have to be cylindrical, but rather could have any desired cross-sectional shape. For example, the body 14 could have a cross-sectional shape that is a square, a rectangle, or an oval. If a non-circular cross-sectional shape is used, preferably the area of the cross-section is approximately 0.008 mm$^2$ to 7 mm$^2$. It is furthermore to be appreciated that the body 14 does not need to be completely straight.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

I claim:

1. A concrete reinforcing member for admixture into a concrete composite, comprising:
    a body extending in a longitudinal direction along an axis, and having a lateral width; and
    two to four anchor segments axially spaced on the body, each said anchor segment having a first lateral extension and a second lateral extension, the lateral extensions each projecting out from the body to respective distal peripheral edges along an associated plane that extends radially relative to the axis of the body, the lateral extensions sized for anchoring the reinforcing member against relative axial movement following solidification of said concrete composite;
    the associated plane of the first lateral extension of one said anchor segment being offset radially about the axis at an angle of between about 30° to 60° relative to the associated plane of the first lateral extension of another said anchor segment,
    wherein the first lateral extension and the second lateral extension are substantially coplanar and define a pair of major surfaces, and wherein said major surfaces are generally planar or generally concave, and are free of protuberances, and a maximum distance between said major surfaces, measured along a line that runs perpendicular to the associated plane of the first lateral extension, is less than the lateral width of the body, and
    wherein the body has a circular, rectangular, square or oval cross-sectional shape, and a maximum cross-sectional width of about 0.1 mm to 3 mm;
    and wherein the concrete reinforcing member has an axial length of about 10 mm to 100 mm;
    each of said anchor segments having an axial length that is about 2 to 12 times the maximum cross-sectional width of the body;
    and wherein each of said anchor segments has a respective axial center point, an axial distance between the respective axial center points of consecutive ones of said anchor segments being about ¼ to ⅛ of the axial length of the concrete reinforcing member;
    and wherein, for each said anchor segment, a minimum distance between said major surfaces is less than ¼ of the maximum cross-sectional width of the body;
    and wherein, for each said anchor segment, a maximum distance between the respective distal peripheral edges of the first lateral extension and the second lateral extension is about 1.1 to 3.0 times the maximum cross-sectional width of the body.

2. The concrete reinforcing member according to claim 1, wherein said anchor segments are formed by compressing selected axially spaced portions of said body.

3. The concrete reinforcing member according to claim 1, wherein the angle is about 45°.

4. The concrete reinforcing member according to claim 1, wherein the concrete reinforcing member has three or four of said anchor segments,
    and wherein the associated plane of the first lateral extension of a further said anchor segment is offset radially about the axis at an angle of greater than 0° and less than 180° relative to the associated plane of the first lateral extension of said one anchor segment,
    and wherein the associated plane of the first lateral extension of said further anchor segment is offset radially about the axis at an angle of greater than 0° and less than 180° relative to the associated plane of the first lateral extension of said another anchor segment.

5. The concrete reinforcing member according to claim 1, wherein said anchor segments are spaced from axial ends of said body.

6. The concrete reinforcing member according to claim 1, wherein the concrete reinforcing member is a steel fiber and has four of said anchor segments,
    said one anchor segment being positioned at a first axial end of the concrete reinforcing member;
    said another anchor segment being adjacent to said one anchor segment, the angle at which the associated plane of the first lateral extension of said one anchor segment is offset radially about the axis relative to the associated plane of the first lateral extension of said another anchor segment being about 45°;
    a further said anchor segment being adjacent to said another anchor segment, the associated plane of the first lateral extension of said further anchor segment being offset radially about the axis at an angle of about 90° relative to the associated plane of the first lateral extension of said another anchor segment; and
    a final said anchor segment being adjacent to said further anchor segment and positioned at a second axial end of the concrete reinforcing member, the associated plane of the first lateral extension of said final anchor segment being offset radially about the axis at an angle of about 45° relative to the associated plane of the first lateral extension of said further anchor segment.

7. The concrete reinforcing member according to claim 1, wherein the concrete reinforcing member is formed from a metal, a polymer, or a ceramic.

* * * * *